July 31, 1962     J. R. R. BERTRAND     3,046,656
MACHINE FOR CUTTING CHEESES OF CYLINDRICAL
SHAPE INTO SECTOR PORTIONS
Filed April 26, 1960     3 Sheets-Sheet 1

United States Patent Office 3,046,656
Patented July 31, 1962

3,046,656
MACHINE FOR CUTTING CHEESES OF CYLINDRICAL SHAPE INTO SECTOR PORTIONS
Jacques Raymond Roger Bertrand, Roquefort-sur-Soulzon-Aveyron, France, assignor to Societe Anonyme des Caves & des Producteurs Reunis de Roquefort, Roquefort-sur-Soulzon, France, a body corporate of France
Filed Apr. 26, 1960, Ser. No. 24,786
Claims priority, application France July 10, 1959
9 Claims. (Cl. 31—26)

The present invention relates to a machine for cutting cheeses of cylindrical shape, such as Roquefort cheese, into sector shaped portions of any desired thickness. Cheese cutting machines for use by retail shopkeepers are known which comprise a vertically movable cutter which may be constituted by a steel wire under which the cheese is placed, the cutting of the cheese into sectors requiring consecutive turning of the cheese about its axis which is effected by hand, the rotational angle of turning, which determines the size of the portion, being merely guessed by the user. The present invention has for its object the provision of a commercial machine designed to effect automatically the cutting up of the cheese into uniform sector-shaped portions having a predetermined weight and thickness and being subsequently conditioned in individual wrappings.

The machine according to the invention comprises a vertically movable support platform, on which the cheese to be cut up is placed, and a fixed cutter device constituted by a number of crossed wires regularly distributed and stretched diametrically in a carrier, the cheese being moved through said carried by an upward movement of the platform.

This support platform has regularly distributed diametrical grooves into which the cutter wires place themselves at the end of the upward movement of the platform in order to disengage themselves from the cheese cut up. These grooves are arranged in such a number and position that it is possible to obtain equal sized portions of cheese by dividing the circle into two, four, six, eight, ten, twelve or sixteen parts.

Below the device for effecting the vertical cut there is arranged a device for a horizontal cut cutting up the cheese preliminarily into slices of desired thickness, constituted by an arm swinging about a vertical axis situated outside the support platform and provided with one or more steel wires stretched out horizontally as well as a centering cylinder into which the cheese is placed in a first phase of the upward movement of the platform, this cylinder having horizontal gaps for the guidance of the wire stretched out on the swinging arm.

An embodiment of the machine according to the invention will now be described by way of example with reference to the accompanying drawings, in which.

Figure 1:
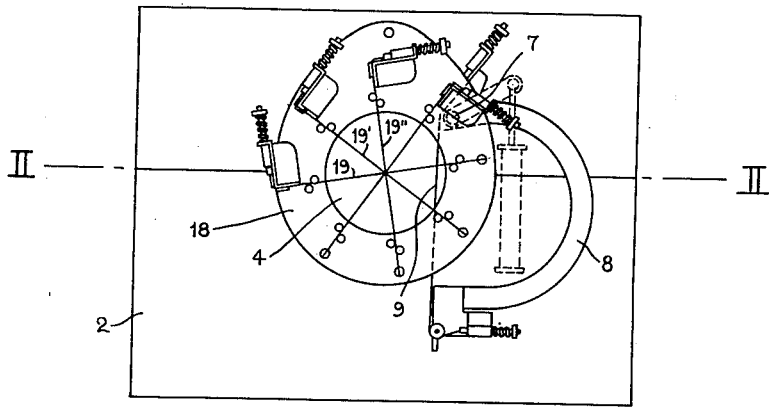
FIG. 1 is a diagrammatical plan view of the machine according to the invention.
Figure 2:
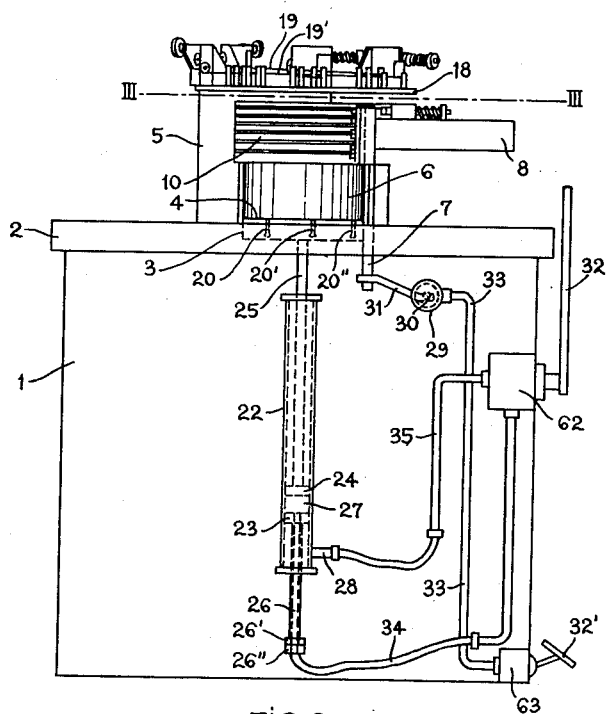
FIG. 2 is an elevational section thereof along line II—II of FIG. 1.
Figure 3:
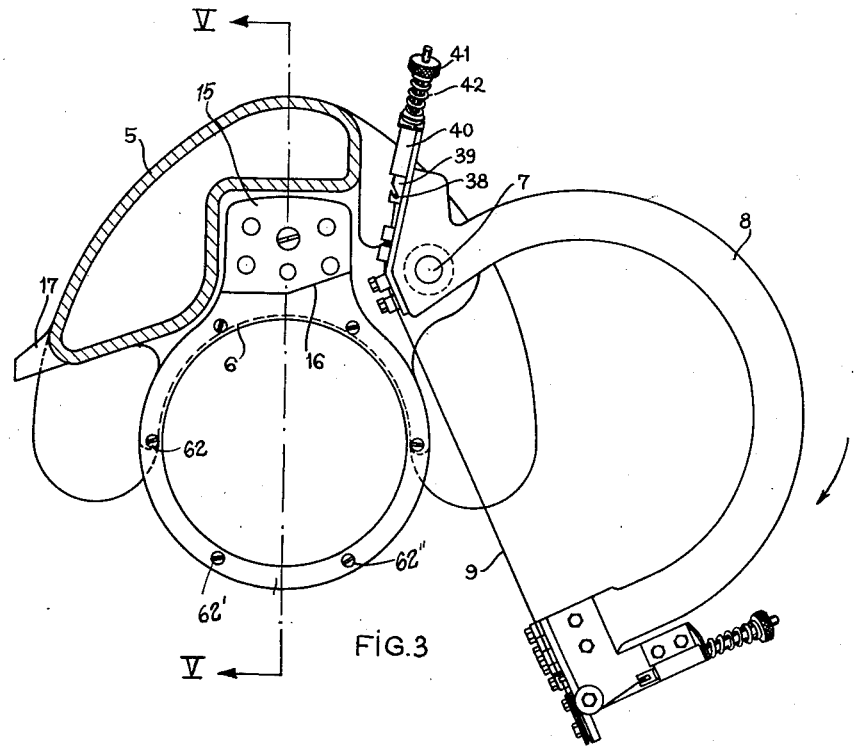
FIGURE 3 is a part sectional view on the line III—III of FIGURE 2 and showing on a larger scale the horizontal cutting device in plan view.

The machine according to the invention comprises a base support in the form of a box 1, in the interior of which the control members hereinafter described are arranged. The upper portion of this box constitutes a worktable 2 which has a central circular recess 3 into which a vertically movable support platform 4 designed to receive the cheese to be cut up is shown engaged in its rest position. The table 2 carries an upright or socle 5 surrounding partly the recess 3 and forming in its lower portion a semi-cylindrical recess 6 which is open laterally and co-axial with the movable platform 4 in such a manner as to allow the centering of the cheese placed on said platform. On the upright a vertical shaft 7 (FIGURES 2 and 3) is pivotally mounted and carries a horizontal arm 8 of arcuate shape, between the ends of which horizontal steel wires 9, 9′, 9″ (FIGURE 4) are stretched. These wires are positioned at regular or irregular intervals depending on whether it is desired to obtain pieces of equal weight or pieces of different weight. These wires are designed for cutting the cheese into horizontal slices. During the horizontal cutting, the cheese is placed in a centering cylinder 10 (FIGURE 5) the inner surface of which is slightly conical and converges upwardly in order to facilitate the centering and retaining of the cheese while cutting, and which is constituted by a number of metal rings 11, 11′, 11″ . . . etc. covered on their two end faces by a layer of plastic material 12—13, 12′—13′, 12″—13″ . . . etc., fixed by means of screws 62, 62′, 62″ . . . (FIG. 3) . . . these rings having external tongues 14, 14′, 14″ by means of which they are assembled with the interposition of spacers 15, 15′, 15″ in such a manner as to form gaps 63, 63′, 63″ serving for the guidance of the wires 9, 9′, 9″ for the horizontal cutting. The covering of the wires 9 with plastic material has the effect of reducing their friction in the gaps thus formed. The spacers 15, 15′, 15″ have oblique edges 16 (FIGURE 3) against which the wires 9 abut at the end of their stroke, after having passed through the cheese from end to end by the pivotal movement of the arm 8 in the sense of the arrow, a stroke-limiting abutment 17 being provided for arresting the pivotal mounted arm 8. The arcuate form of this arm 8 allows the cheese cut into horizontal slices to be disengaged completely from this cutting device, the wires 9 abutting at the end of the stroke the edges 16, and the arcuate arm 18 finding itself at this stage at one side or the other of the guide cylinder 10.

Once the cutting into horizontal slices has been achieved, the support platform 4 receives a second upward movement, and the cheese emerging from the centering cylinder 10 moves into the fixed device for the vertical cutting constituted by a crown 18 fixed to the top of the upright 5 (FIGURES 1, 2, 6 and 7), on which by means of devices to be described later wires 19, 19′, 19″ . . . are stretched out diametrically and intersect on the axis of the support platform 4 and of the centering cylinder 10. These wires are disposed on different levels and are slightly inclined relative to the plane of the support platform in such a manner as to reduce the force required for the cut by offsetting the moments when the different wires engage the cheese and by having the cheese engaged by each wire not over the whole length of a diameter at the same time. The support platform is provided on its upper face with diametrical grooves 20 regularly spaced and of a depth sufficient to allow said wires to penetrate into them in order to disengage themselves from the cheese after the same has been traversed by these wires from end to end and thus cut up into sectors. At the end of the upward movement the support platform stops at the level of a removable reception shelf 21 constituted by an annular plate resting on the device 18 for the vertical cut on to which shelf the cut up portions are pushed before the platform 4 is restored to its lower starting position for beginning a new cutting operation on a new cheese.

The manner of driving of the movable members of the machine will now be described as well as the constructional details which are of importance for its good functioning.

The drive of the movable members may be effected by any mechanical transmission driven by any suitable motor, for example an electric motor. However, in the preferred embodiment illustrated in the drawings this drive is effected by the aid of pneumatic jacks which have the advantage of permitting a high speed of movements of the idle strokes as well as great flexibility at the beginning and during the working phases. Thus the movement of the movable support platform 4 is effected by a jack having three positions and constituted by a vertical cylinder 22 wherein two pistons 23, 24 are movable independently. The piston rod 25 of the upper piston 24 is integral with the support platform 4, while the piston rod 26 of the lower piston 23 is hollow and serves as an inlet for compressed air into the chamber 27 enclosed between the pistons 23, 24. The lower piston 23 has to this effect a central port, this lower piston 23 being in turn operated by a lateral air supply 28.

In the rest position illustrated in the drawing the two pistons bear on one another; the entry of compressed air under the piston 23 effects an upward movement of the assembly, a stop arresting the piston 23 when the support platform has put a cheese in place into the device for horizontal cutting, in the centering cylinder 10. This stop is constituted by a nut 26' and a lock nut 26'' screwed on to the piston rod. By adjustment of these nuts one may attain a definite position of the support platform 4 with respect relative to the cutter wires of the swinging arm 8 at the end of the first stroke.

At this moment the swinging arm 8 is operated, for effecting the horizontal cut, by a jack 29 having a horizontal axis, the position of which is coupled by a connecting rod 30 to a crank arm 31 keyed to the vertical shaft 7 of the arm 8. Once the horizontal cut has been effected, compressed air is allowed to enter between the pistons 23, 24, and the upper piston 24 is pushed upward, making the cheese carried by the platform 4 pass through the vertical cutting device 18—19. During the vertical cut the piston 23 assures a resilient reaction to the air pressure acting on the piston 24 in such a manner that the engagement of the cheese by the cutting wires 19 may be effected with great flexibility. The piston 24 stops at an abutment at the end of stroke of the platform 4, the portions of the cheese are slid on to the receiving shelf 21, then the supply of compressed air is cut off, and the jacks as well as the members operated by them return to their initial positions.

All these movements are controlled by a lever 32 operated by hand and acting on a three-way valve 62 for the upward movement of the double piston, and by a pedal 32' actuated by the foot for the horizontal cutting movement and operating a valve 63 controlling the supply to the conduit 33 of the jack 29. The lever 32 has three corresponding positions, the first being the rest position, the second for controlling the piston 23 moving the cheese into the cylinder 10, and the third for controlling the piston 24 with the effect of moving the cheese through the vertical cutting device; the pedal operated by the foot serves for the control of the jack 29 of the arm for the horizontal cut.

Figure 5:
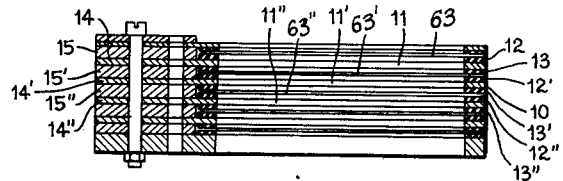
FIGURE 5 is a sectional elevation of the centering and guiding device for the horizontally cutting wires along line V—V of FIG. 3.
Figure 4:
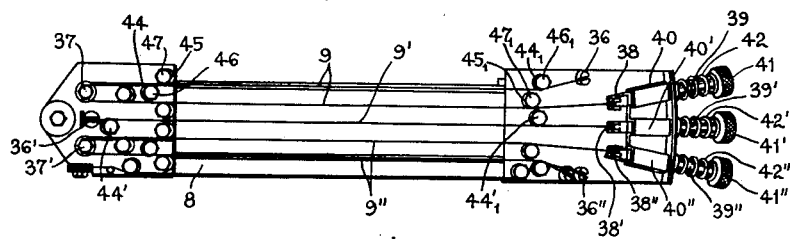
FIGURE 4 is an elevation of the arm for effecting the horizontal cut.
Figure 6:
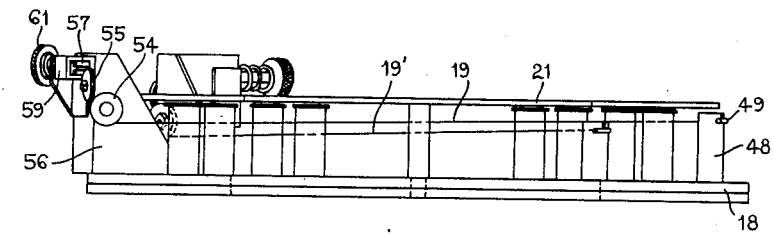
FIGURE 6 is an elevation of the device for the vertical cut wherein for the sake of clarity only the devices for the fixing of two diametrical wires are shown.
Figure 7:
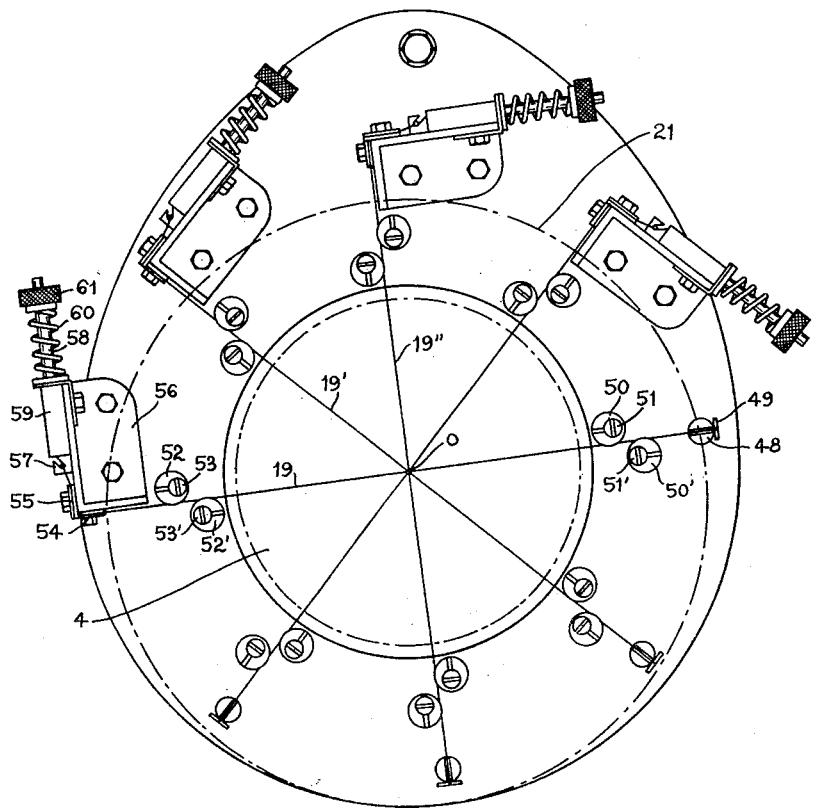
FIGURE 7 is a plan view thereof.

An important constructional feature of the device according to the invention consists in the manner of fixation and tensioning of the cutter wires. All the cutter wires are tensioned by means of devices comprising compensation springs operating preferably under compression, which permits, by regulating the compression of the spring, the tensioning of the wires to be adjusted easily and with accuracy. As can be seen in FIGURES 4 and 5, the wires for effecting the horizontal cut, such as wires 9 and 9'', are fixed at one end to one end of the arm 8, for example on screws 36, 36'', then pass to the other end of the arm 8 on deflector rollers 37, 37'', and return to the first end of the arm where they are attached to hooks 38, 38'', provided at the end of a rod 39, 39'' sliding in guides 40, 40'' fixed to the arm 8. These rods have screw-threaded ends on which knurled nuts 41, 41'' are screwed, and the compensation springs 42, 42'' are placed on these rods between the nuts 41 and the guides 40 which they abut. The distance between the two strands of each wire 9, 9'' which corresponds to the thickness of the slices cut off is adjusted with accuracy by means of the pair of rollers 44—45, $44_1$—$45_1$ mounted eccentrically on the bolts 46—47, $46_1$—$47_1$ at each end of each strand of the wire and on which these wires bear, a slight turning of the eccentric rollers allowing the distance and the parallelism of the wires to be adjusted. Instead of forming the wires with two strands such as 9 and 9'', the wires may be single such as the wire 9': the point of fixation 36' is in this case at the opposite end of that where the tensioning device 38'—39'—40'—41'—42' is located, and the eccentric adjustment rollers 44'—45', $44_1$'—$45_1$' are provided at both ends.

The wires of the device for the vertical cut (FIGURES 6 and 7) comprise fixing and tensioning means analogous to those described hereinabove. These wires 19 are fixed at one end to a short pillar 48 fixed to the crown 18, on the top of which pillar there is provided a slot into which the wire engages, the latter being retained by a transverse pin 49. The wire then passes between two eccentric adjustment rollers 50, 50' carried by screws 51, 51', passes diametrically across the aperture of the crown 18, passes back between two other eccentric adjustment rollers 52, 52' mounted on the screws 53, 53', and then passes at a right angle over two deflector pulleys 54, 55 mounted on a square bracket 56 fixed to the crown 18. The wire is then attached to the hook 57 provided at the end of a rod 58, which is slidable in a guide 59 of the bracket 56 and provided with a compensation spring 60 and an adjustment nut 61.

The fixation pillars 48 have different heights for the different wires 19, and the inclination of these wires with respect to the horizontal is determined by the adjustment in height of the deflector pulley 54 mounted on the bracket 56 of the tensioning device. The rotatable eccentric rollers serve for regulating with accuracy the orientation of the wires in such a manner that the angular offset between consecutive wires may be uniform and that all the wires may intersect on the axis O of the machine.

What is claimed is:

1. A machine for cutting cheeses of cylindrical shape into sector shaped portions, comprising a worktable having a circular opening therein, a circular platform on which the cheese to be cut is placed and fitting at rest in said opening, a stationary centering cylinder coaxially arranged with said platform at a distance above the worktable and of which the inner diameter and the height are substantially equal to those of the cheese respectively, said cylinder being provided with horizontal circular slots arranged from another at spaces equal to the thickness of the cheese sector portions to be made, means to vertically move said circular platform to introduce in a first step the cheese into said centering cylinder, a horizontal cutting device for preliminary cutting the cheese into slices of the said thickness and comprising an arc shaped horizontal arm, a vertical shaft pivotally arranged on the worktable and carrying said arm, means for swinging said arm, steel wires horizontally stretched between the ends of said arm and facing the slots of the centering cylinder respectively, the distance between the middle of said wires and the middle of said arm being larger than the diameter of the centering cylinder whereby said wires are disengaged from the cheese at the end of the swinging stroke of the arm, a stationary vertical cutting device comprising a horizontal frame arranged above the centering cylinder and having a circular opening therein coaxially arranged with the movable circular platform to move the cheese therethrough in a second step after the horizontal cut has been performed, a number of crossed steel wires regularly distributed and diametrically stretched across said opening of the frame, and regularly distributed diametrical grooves provided on the upper face of the support platform and adapted to be engaged by said steel coins at the end of the upward movement thereof in order to disengage said wires from the cut up cheese.

2. In a machine according to claim 1, an upright fixed on the worktable and having at its base a semi-circular recess open laterally and coaxial with the circular opening of the worktable to permit the positioning of the cheese to be cut on the support platform, the centering cylinder and the frame of the vertical cutting device being carried by said upright.

3. A machine according to claim 1, wherein the centering cylinder has a slightly tapered upwardly converging inner surface to facilitate the centering of the cylindrical cheese forced therein by the movable support platform.

4. A machine according to claim 1, wherein the centering cylinder comprises superimposed flat metal rings provided on both their faces with a sheet of plastic material and having on a part of their periphery an enlarged portion forming a plate, spacers interposed between said plates to define between said rings the slots guiding the horizontal steel wires carried by the pivotally arranged arm, the inner edge of said spaces forming abutments for said wires to stop the pivoting arm after said wires have disengaged the cheese, and bolts for assembling said plates and fixing same on the upright carried by the worktable.

5. A machine according to claim 1, comprising a first pneumatic jack having a horizontally arranged cylinder, a piston sliding thereon and a crank shaft connecting said piston to the vertical shaft carrying the arc shaped cutter arm to control the rotation of said shaft, a second pneumatic jack for driving the movable support platform and adapted to have three positions corresponding respectively to the rest position of the platform at the level of the worktable, to the insertion of the cheese into the centering cylinder wherein the cheese is cut to slices by the wires carried by said swinging arm, and to the end of the vertical cut after the crossed diametrical wires are disengaged from the cheese cut in sector portions.

6. A machine according to claim 5, comprising a first pneumatic jack having a horizontally arranged cylinder, a piston sliding thereon and a crank shaft connecting said piston to the vertical shaft carrying the arc shaped cutter arm to control the rotation of said shaft, a second pneumatic jack for driving the movable support platform and adapted to have three positions corresponding respectively to the rest position of the platform at the level of the worktable, to the insertion of the cheese into the centering cylinder wherein the cheese is cut to slices by the wires carried by said swinging arm, and to the end of the vertical cut after the crossed diametrical wires are disengaged from the cheese cut in sector portions, said second pneumatic jack comprising a cylinder having a vertical axis, two independent pistons movably arranged in said cylinder and arranged to be in contact with one another in their lowest position corresponding to the rest position of the platform, a rod fixed to the upper piston and carrying said platform, an inlet provided at the base of the cylinder for the compressed air acting on the lower piston, a hollow piston rod slidably arranged in the bottom of the cylinder, carried by the inner face of said lower piston and issuing in the space comprised between the two pistons and means to admit compressed air into said hollow rod to drive the upper piston, abutment means provided on said hollow rod whereby the second position of the jack is determined.

7. A machine according to claim 5, comprising a first pneumatic jack having a horizontally arranged cylinder, a piston sliding thereon and a crank shaft connecting said piston to the vertical shaft carrying the arc shaped cutter arm to control the rotation of said shaft, a second pneumatic jack for driving the movable support platform and adapted to have three positions corresponding respectively to the rest position of the platform at the level of the worktable, to the insertion of the cheese into the centering cylinder wherein the cheese is cut to slices by the wires carried by said swinging arm, and to the end of the vertical cut after the crossed diametrical wires are disengaged from the cheese cut in sector portions, said second pneumatic jack comprising a cylinder having a vertical axis, two independent pistons movably arranged in said cylinder and arranged to be in contact with one another in their lowest position corresponding to the rest position of the platform, a rod fixed to the upper piston and carrying said platform, an inlet provided at the base of the cylinder for the compressed air acting on the lower piston, a hollow piston rod slidably arranged in the bottom of the cylinder, carried by the inner face of said lower piston and issuing in the space comprised between the two pistons and means to admit compressed air into said hollow rod to drive the upper piston, abutment means provided on said hollow rod whereby the second position of the jack is determined, a valve controlling the admission of air to the horizontal jack and a pedal actioning said valve, a three-way valve controlling the admission of air to the vertical jack and a lever actioning said three-way valve and having two operating positions.

8. A machine according to claim 1, wherein the cutting wires are provided with means to fixedly attach one end thereof to their support, whereas a guide pulley is provided on said support at the other end of the wire, a rod to which said other end of the wire is attached, a guide in which said rod is slidably arranged, a spring acting on said rod to stretch the wire and a nut screwed on the screw-threaded end of said rod to adjust the compression of said spring.

9. A machine according to claim 1, wherein the cutting wires are provided with means to fixedly attach one end thereof to their support, whereas a guide pulley is provided on said support at the other end of the wire, a rod to which said other end of the wire is attached, a guide in which said rod is slidably arranged, a spring acting on said rod to stretch the wire and a nut screwed on the screw-threaded end of said rod to adjust the compression of said spring, a pair of vertical cylinders arranged on the support of the cutting wires at least adjacent one end thereof and arranged in a radially and circumferentially offset relation, eccentrical screws carrying said cylinders to adjust the tension and direction of said wires.

References Cited in the file of this patent
UNITED STATES PATENTS

| | | |
|---|---|---|
| 884,845 | Nicklin | Apr. 14, 1908 |
| 1,498,881 | Meany | June 24, 1924 |
| 2,692,430 | Kraft et al. | Oct. 26, 1954 |

FOREIGN PATENTS

| | | |
|---|---|---|
| 487,697 | Canada | Nov. 4, 1952 |